Figure 1:
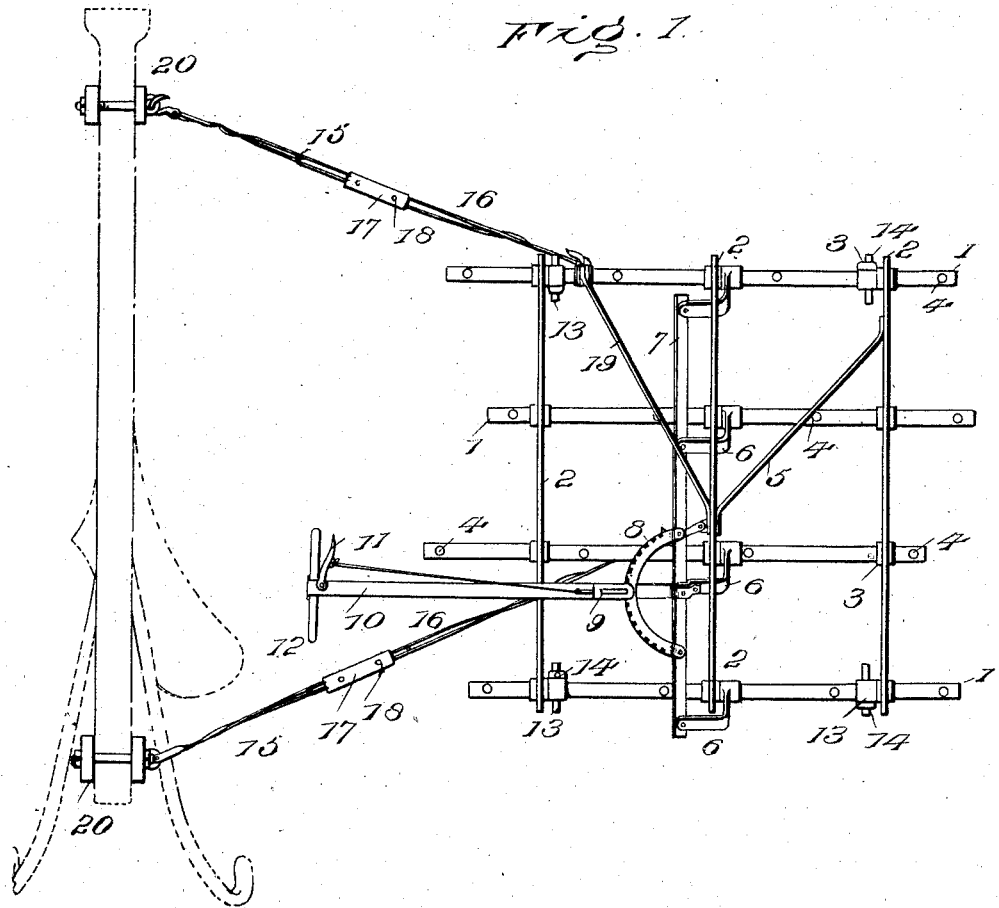

No. 874,185. PATENTED DEC. 17, 1907.
H. C. GREEN.
HARROW ATTACHMENT.
APPLICATION FILED OCT. 29, 1906.

2 SHEETS—SHEET 1.

Witnesses

Inventor
H. C. Green
By
Attorneys

No. 874,185. PATENTED DEC. 17, 1907.
H. C. GREEN.
HARROW ATTACHMENT.
APPLICATION FILED OCT. 29, 1906.
2 SHEETS—SHEET 2.
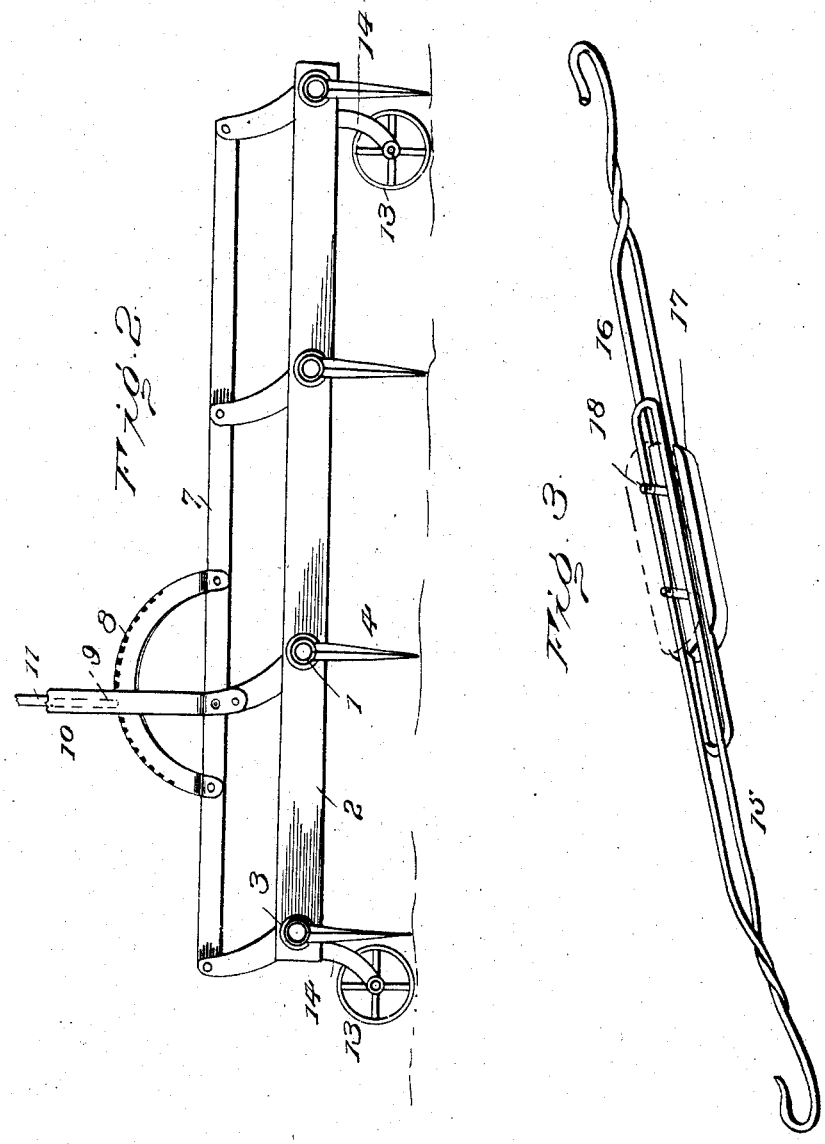
Witnesses
Inventor
H. C. Green
By
Attorneys

UNITED STATES PATENT OFFICE.

HENRY C. GREEN, OF PORT, OKLAHOMA.

HARROW ATTACHMENT.

No. 874,185.  Specification of Letters Patent.  Patented Dec. 17, 1907.

Application filed October 29, 1906. Serial No. 341,096.

*To all whom it may concern:*

Be it known that I, HENRY C. GREEN, citizen of the United States, residing at Port, in the county of Washita and State of Oklahoma, have invented certain new and useful Improvements in Harrow Attachments, of which the following is a specification.

This invention provides a device of novel harrow structure which may be applied to a plow or like agricultural implement to enable preparation of the ground simultaneously with the plowing or opening operation, said attachment comprising adjustable tooth carrying rods and adjunctive parts, the same being combined and arranged in a peculiar and unique manner as will appear more fully hereinafter and illustrated in the drawings hereto attached and in which:

Figure 1 is a top view of a harrow attachment embodying the invention; Fig. 2 is a side elevation of the harrow, showing the parts on a larger scale and having the upper portion of the operating lever broken away and the draft attachment omitted; and Fig. 3 is a detail perspective view of one of the draft connections.

Corresponding and like parts are referred to in the following description and indicated in all the views of the drawings by the same reference characters.

The framework of the attachment comprises a series of rods 1 and 2, the rods 2 being arranged at right angles to the rods 1. The rods 2 are relatively fixed and have a parallel relation and are comparatively thin and wide and are provided at intervals with openings to receive the rods 1 which are mounted in the bars 2 to receive a partial rotary movement. The rods 1 are hollow and are arranged in parallel position and are set so that the end of one projects beyond the end of the other so as to throw the teeth carried thereby out of line. To hold the rods 1 in fixed position they are provided with pairs of collars 3 which are clamped or otherwise secured thereto, a pair of collars being provided for each bar 2 so as to prevent endwise movement thereof upon the rods 1. Each rod 1 is provided with a series of teeth 4 which are secured thereto in any substantial manner, such for instance as having their upper ends fitted into openings formed in the said rods 1. A brace 5 stiffens the main frame and is connected at opposite ends to the bars 2.

Each of the rods 1 is provided with an arm 6 which is clamped or otherwise secured thereto, the several arms 6 being in line and having pivotal connection at their upper ends with a beam 7 which is adapted to be moved so as to effect a turning or rocking of the rods 1 to change the inclination of the teeth 4 as may be required.

The arms 6 are located intermediate the ends of the rods 1 and constitute one set of stops to limit the movement of the intermediate beam 2 in one direction. The beam 7 is provided with a quadrant 8 having its outer edge toothed for coöperation with a latch bolt 9 to hold an operating lever 10 in an adjusted position. The lever 10 is secured at its inner end to an extension of one of the arms 6 and has the latch bolt 9 mounted thereon in any accustomed way. A hand latch 11 is connected to the operating lever 10 and is suitably connected to the latch bolt 9 to operate the same when it is required to move the operating lever 10. A handle bar 12 is secured to the outer ends of the operating lever 10 and is grasped when it is required to operate the lever 10 to change the inclination of the teeth 4 either to clear the same of trash or to provide a scratch or a smoothing harrow. The harrow attachment is mounted upon caster wheels 13, which are fitted to frames or standards 14 clamped at their upper ends to the frame rods.

The draft bars are connected at one end to the harrow attachment and at the opposite end to the plow or other implement with which the attachment coöperates. Each draft attachment is extensible and composed of sections 15 and 16 and a clamp 17, the latter consisting of two plates between which the opposing ends of the sections 15 and 16 are gripped, the plates of the clamp being drawn together by bolts 18 passed through corresponding openings therein. One of the draft attachments exerts a pulling force, whereas the other is used for pushing. The oppositely inclining draft attachments are oppositely inclining and one is connected to a brace 19 which also coöperates with the brace 5 to strengthen the main frame. A clamp 20 connects each draft attachment with the beam or like part of the implement to which the attachment is coupled. When the attachment is coupled to the beam of a plow, the earth is harrowed or pulverized and leveled simultaneously with the plow, thereby materially diminishing the labor and saving time in preparing the soil for reception of the seed. Moreover, by harrowing the ground at the time of plowing, the moisture is retained and the clods are more readily broken up and pulverized and as a result under like conditions a heavier crop is obtained.

Having thus described the invention, what is claimed as new is:

The herein described harrow attachment for plows comprising a plurality of spaced bars, rods journaled upon the bars and disposed transversely with respect to the same, teeth carried by the rods, means for rocking the rods within their bearings to adjust the inclination of the teeth, clamps upon the front and rear portions of the plow, and oppositely inclined draft bars extending from the harrow attachment and engaging the said clamps, each of the draft bars comprising sections the ends of which overlap and are slotted, the said sections being held in an adjusted position by clamping blocks applied to opposite sides thereof and actuated by bolts passing through the slotted portions of the sections.

In testimony whereof I affix my signature in presence of two witnesses.

HENRY C. GREEN. [L. S.]

Witnesses:
J. H. TAYLOR,
M. L. MOSHER.